UNITED STATES PATENT OFFICE.

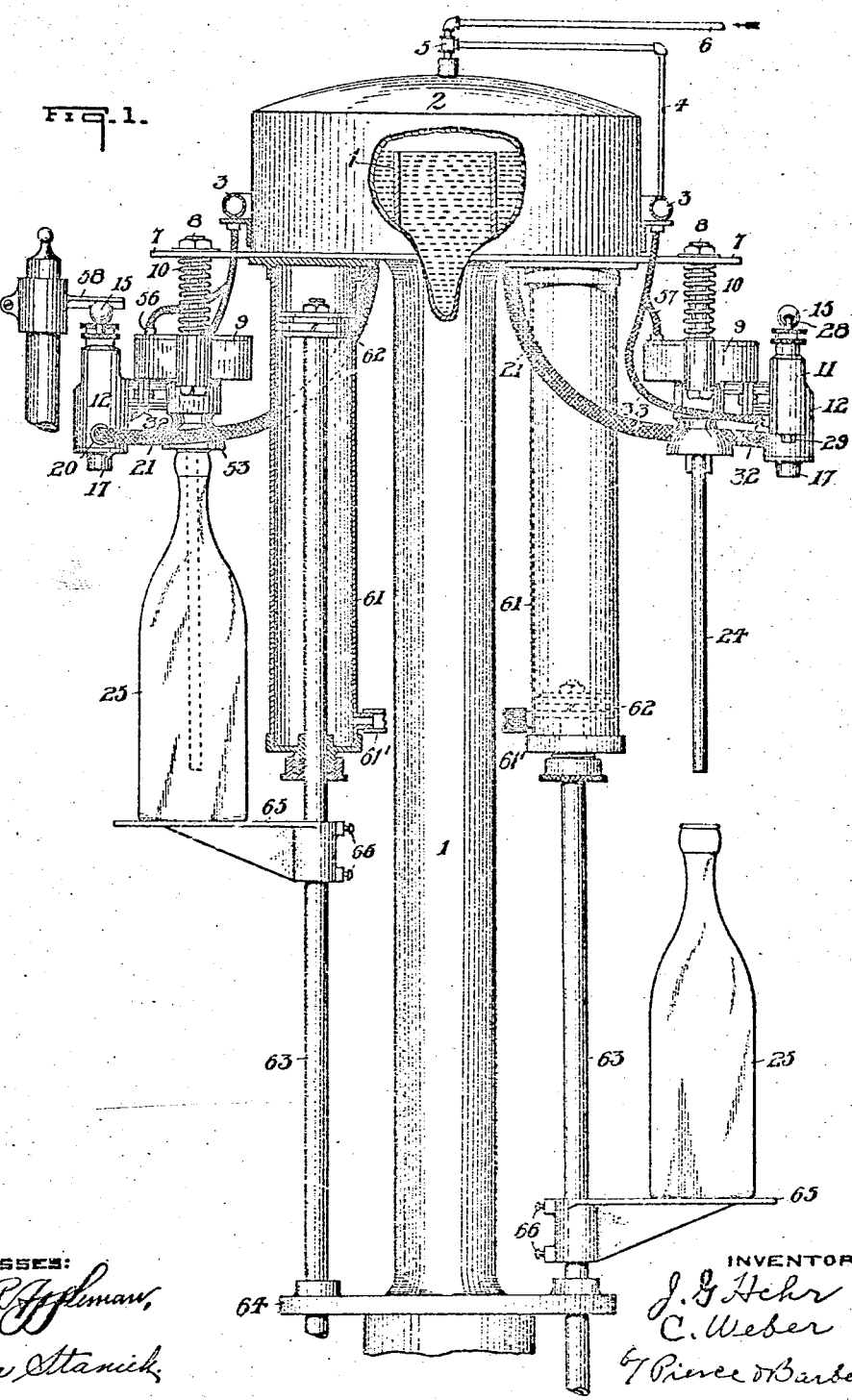

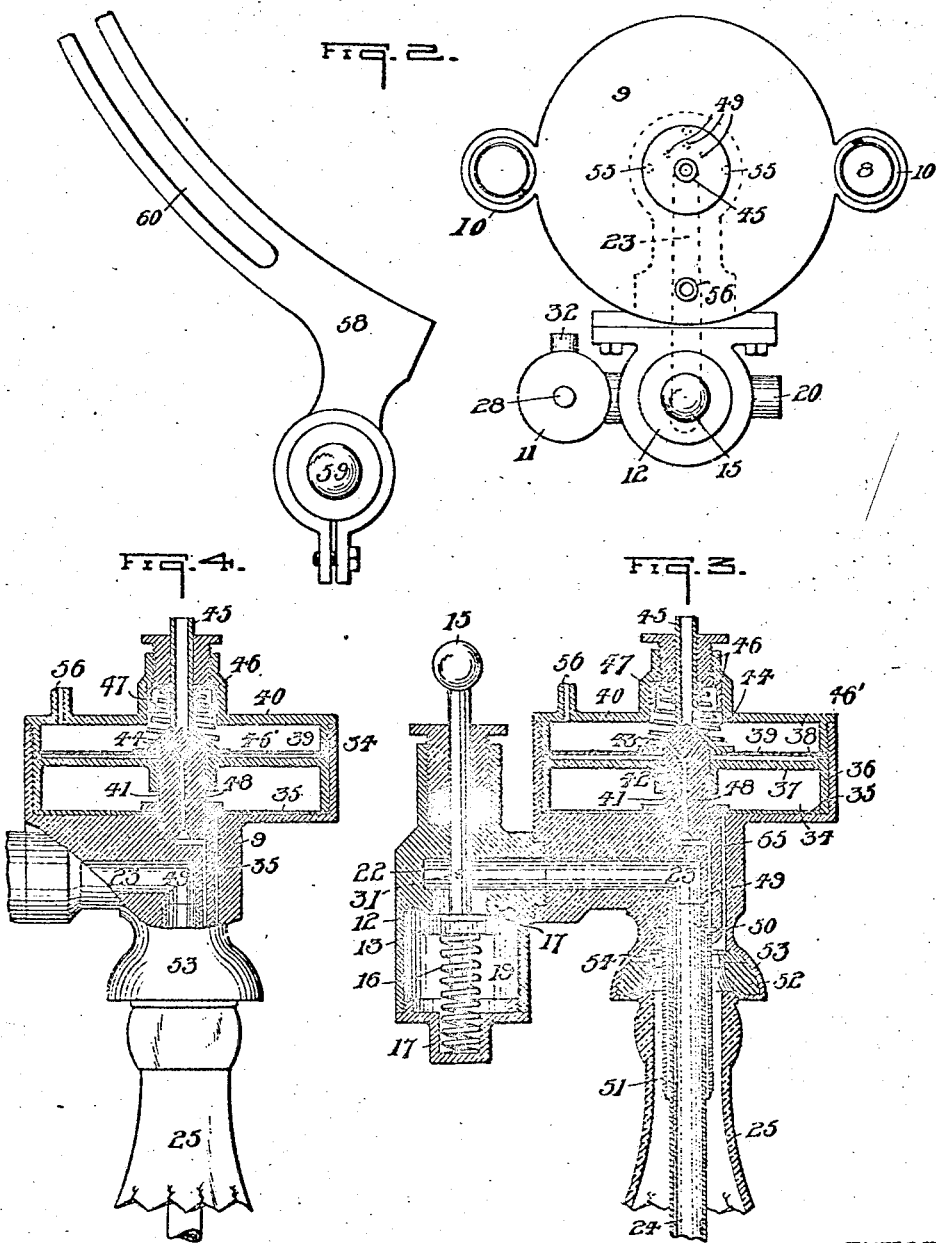

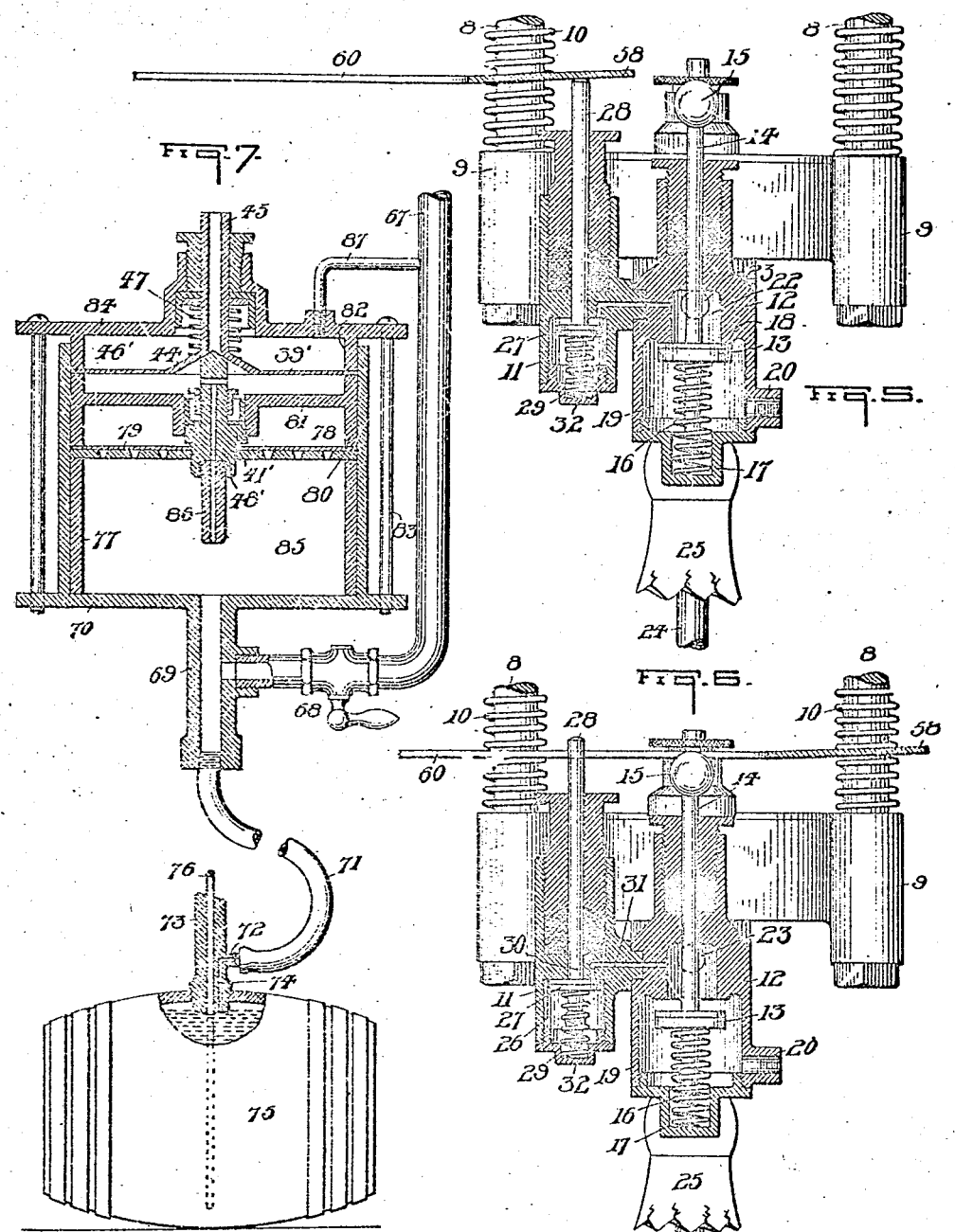

JOHAN G. HEHR, OF PITTSBURG, AND CONRAD WEBER, OF MILLVALE, PENNSYLVANIA.

BEER-BOTTLING MACHINE.

No. 895,268.

Specification of Letters Patent.

Patented Aug. 4, 1908.

Application filed March 19, 1906. Serial No. 306,709.

*To all whom it may concern:*

Be it known that we, JOHAN G. HEHR and CONRAD WEBER, citizens of the United States, residing at Pittsburg and Millvale, respectively, in the county of Allegheny and State of Pennsylvania, have invented or discovered new and useful Improvements in Beer-Bottling Machines, of which the following is a specification.

Our invention relates to machines for bottling or kegging beer or other liquid containing a gas, such as carbonic acid gas, for example, which would escape and cause foaming or effervescence, if the liquid should be delivered into bottles or kegs against atmospheric or other pressure less than that necessary to prevent the escape of said gas.

Heretofore, the compressed air, which has been introduced into the bottles or kegs previous to the flow of liquid thereinto, has been forced back to a gas or air space above the beer in the beer-tank. This is objectionable as it places in contact with the beer unsterilized air, which is liable to contain bacteria more or less harmful to the beer. We expel the air in the bottles or kegs directly into the air, thereby saving considerable back-pressure, which exists when the expelled air is forced back to the beer-tank. We keep our beer-tank full all the time and thereby do not have fluctuations of pressure on the beer as with the air space, the fluctuations arising from the intermittent filling of the bottles or kegs or from other causes.

Referring to the drawings which form a part of this specification, Figure 1 is a side elevation of a beer bottling machine, showing provisions for only two bottles, though any desired number may be provided for; Fig. 2, a plan showing one bottle filling element and the cam plate for controlling the valves of said element; Fig. 3, a central vertical section of a single filling element, showing the parts as they are while the beer is flowing into the bottle; Fig. 4, a similar section with the inlet valve mechanism omitted, the parts being as they are before the bottle has been filled and before the air escape valve has closed; Fig. 5, a central vertical section at right angles to those of Figs. 3 and 4, showing the air-admission valve open; Fig. 6, a similar view showing the air valve closed and the beer inlet valve open; and Fig. 7, a modification of our invention, adapted to the filling of kegs.

On the drawings 1 represents a vertical column, mounted so as to rotate on its axis by any suitable mechanism (not shown). On the top of this column is the beer tank or reservoir 2, into which the beer is discharged through the hollow column and around which is placed the circular tubular reservoir 3 to contain compressed air, this reservoir being shown in section on Fig. 1. The compressed air is supplied to the reservoir by the pipe 4 which leads to the top of the tank 2, where at the axial center thereof is the vertical coupling 5, connected to the fixed air-supply pipe 6, whereby the pipe 4 may rotate with the tank while connected to the air supply pipe 6.

The column supports in any approved manner, as by the lugs 7, any desired number of independent bottle filling elements. We have shown only two such elements on Fig. 1, but it will be readily understood that a large number of filling elements may be distributed around the column by making the circle of element holding lugs of the required diameter.

Each bottle filling element is constructed as follows: A pair of lugs 7 (Fig. 1) are provided with dependent bolts or rods 8, having slidably secured to their lower ends the cross-head 9, a spring 10 encircling each rod 8 and seated between one of the lugs 7 and the cross-head 9, so as to produce a downward pressure on the latter. The cross-head 9 has secured to its periphery the casings 11 and 12 for the air and beer inlet valves. The casing 12 contains the reciprocating valve 13, having the vertical stem 14 extending out of the top of the casing, above which it is provided with the knob 15. The valve has a downwardly projecting stem, encircled by the spring 16 seated on the bottom cap 17 of the casing 12 so as to urge the valve up towards its seat 18. The casing 12 has between the valve 13 and the cap 17 the chamber 19 into which the beer is admitted by the ported nipple 20, connected by the pipe 21 to the beer tank 2. The casing 12 has above the valve 13 the chamber 22, which leads horizontally by the passage 23 into the cross-head 9, where it turns downwardly and is extended by the pipe 24 which reaches nearly to the bottom of the bottle 25 during the filling operation. The casing 11 is secured to one side of the casing 12 and has therein the valve chamber 26 having the valve 27 provided with the stem 28 extending above the top of the casing. The spring seated between the valve and the cap 29 at the bottom of the chamber 26 seats the valve normally over the port or ports 30 leading by the passage 31 into the chamber 22 of the casing 12. 32 is the ported nipple by which air is introduced to the chamber 26, said nipple being connected by the pipe 33 to the air tank 3.

Above that portion of the cross-head in which the passage 23 is situated, is the hollow chamber 34, having the diaphragm 35 preferably on its floor. On this diaphragm is the annulus 36 having the partition 37 and the top annulus 38, on which is seated a second diaphragm 39 held in place by a screw cap 40, whose annular edge rests on the diaphragm and by its pressure clamps the diaphragms securely in the positions described.

The diaphragm 35 is secured to the piston 41 which works in a recess in the cross-head below the diaphragm 35 and in the partition 37, the piston being packed in the said recess and partition as shown at 42. The upper end of the piston 41 is formed into a conical valve 43, which has its seat in the projection 44 secured to the diaphragm 39. The projection has therein a conical seat adapted to the valve 43, from the apex of which seat extends the vent tube 45, packed by the leather 46 so as to make the chamber 46' between the diaphragm 39 and the cap 40 air-tight. The spring 47 urges the valve seat toward the conical valve 43. The piston 41 has longitudinal thereof the air-passage 48 which is branched at the upper end through the valve 43.

From the bottom of the recess in which the piston 41 works the three passages 49 one only being shown in Figs. 4 and 5 extend downwardly to the chamber 50 around the pipe 24, which chamber communicates with the interior of the tube 51 which surrounds the tube 24 and is spaced slightly therefrom, so as to permit air in the bottle 25 to pass between the tubes 24 and 51 to the chamber 50 and the passages 49. The tube 51 extends only a short distance into the neck of the bottle. The upper end of the bottle engages an elastic rubber ring 52 seated in the bell-shaped extension 53 on the underside of the cross-head 9. The ring 52 rests against a metal retaining ring 54 at the top of the extension 53.

The space around the tube 51 communicates with two or more passages 55 which extend through the cross-head 9 to the floor of the chamber 34 beneath the diaphragm 35. Air is led to the chamber 46' through the nipple 56, which is connected to the pipe 33 by the branch pipe 57.

The cam plate 58 secured to one or more posts 59 is in the line of travel of the stems of the valves 13 and 27, when a bottle 25 is being filled, as will be described presently. The forward end of the plate is inclined downwardly in the direction of the travel of the filling mechanism for a short distance, after which the plate 58 may be horizontal. At a short distance from the front end of the plate 58 is the slot 60 into which the valve stem 28 passes and travels, the slot not permitting the knob 15 on the valve stem 14 to pass through.

The top of the column 1 supports for each filling element a cylinder 61, in which works the piston 62 secured to the piston rod 63, slidable through the flange 64 secured to the column. A bottle rest or stop 65 is adjustably secured to the piston rod by the set screws 66 to accommodate bottles of different lengths. Air is admitted to and exhausted from the cylinders 61 through the passages 61' leading to the lower portion thereof beneath the pistons 62.

The operation is as follows, the parts being as shown in Fig. 1. The column is set in rotation so that the bottle filling element moves toward the left on Fig. 1. A bottle is set on the step 65 in its lowered position, the neck of the bottle being below the end of the pipe 24, as shown on Fig. 1. The piston 62 is actuated to raise the bottle into contact with the rubber ring 52 and to cause the bottle to lift the cross-head 9 so as to bring the tops of the valve stems 14 and 28 high enough to be engaged by the cam plate 58. The valve stem 28 first engages the plate 58, whereby the valve 27 is depressed or moved from its seat, permitting compressed air to pass from the chamber 26, through the port 30, the passage 31, the chamber 22, the passage 23, and the tube 24 into the bottle 25, as shown in Figs. 3 and 6. The air will not escape from the bottle as the pressure on the diaphragm 39 through the passage 48 of the piston 41 is counteracted by an equal air pressure in the chamber 46' and the spring 47. After the compressed air has been admitted to the bottle and the pressure is equal to the tension or pressure of the gases in the beer, the valve stem enters the slot 60 whereby the valve 27 is closed, cutting off the air supply. The knob 15 is then depressed by the cam plate 58, whereby the valve 13 is lowered as shown on Fig. 6. The beer then passes from the chamber 19 to the chamber 22 and passes through the passage 23 and the tube 24 into the bottle. During the entrance of the beer into the bottle the compressed air therein is forced up between the tubes 24 and 51, and through the passages 49 and 48 against the valve seat 44, which it lifts, the air escaping through the outlet passage 45.

As soon as the beer seals the lower end of the tube 51, the air is then forced through the passages 55 against the diaphragm 35, which, being secured to the piston, raises the latter so as to close the valve face 43 on its seat 44 thereby closing the passage 45. At this time the knob 15 escapes from beneath the plate 58, the valve 13 closing, and leaving the bottle filled and ready to be removed from the machine. The bottle is lowered by exhausting the pressure from under the piston 62 and removed to the capping machine. The process outlined is the same for each bottle.

The holes 49 are preferably smaller than the holes 55. As soon as the end of the tube 51 is sealed, the air outside the same becomes confined. The beer still flowing into the bottle, now compresses this air to a higher tension than before, causing it to lift the diaphragm 35 and the piston 41 as explained.

Referring now to Fig. 7, the air inlet pipe 67 is provided with the cock 68 and leads to the pipe 69 on the lower end of the valve casing 70. The lower end of the pipe 69 is connected by the pipe 71 to the nipple 72 connected to the plug or rod 73, which has one or more passages 74 leading air from the nipple 72 into the keg 75 and which contains the tube 76 connected to the beer supply and extending nearly to the bottom of the keg. The plug or rod 73 fits air-tight into or over the bung-hole of the keg.

The bottom of the casing 70 supports the annulus 77, on whose top is the perforated partition 78, supporting the diaphragm 79. This diaphragm is held in place by the cylinder 80, having the partition 81. The top edge of the cylinder supports the diaphragm 39', on which rests the ring 82. The annulus 77, the partition 78, the diaphragms 39' and 79, the cylinder 80, and the ring 82 are clamped together by the bolts 83 which pass through the holes in the bottom of the casing and in the cap 84. The diaphragm 39' has the valve seat 44 and the vent pipe 45 the same as the diaphragm 39 in Fig. 3. The spring 47 also serves the same function as in Fig. 3.

The valve seat 44 is adapted to the valve face on the upper end of the piston 41', which is secured to the diaphragm 79 and is movable up and down through an opening in the partition 81 in which the piston is packed air-tight. Between the bottom of the casing 70 and the partition 78 is the chamber 85, into which depends the tube 86 secured to the piston 41', this tube communicating with the passage 48' in the piston, this passage opening by branches into space between the partition 81 and the diaphragm 39'. The chamber 46' is in communication with the air pipe 67 through the branch pipe 87.

The operation of the device of Fig. 7 is as follows: The parts being in the position shown, air is admitted to the keg by opening the cock 68. As soon as the pressure of the air in the keg equals the pressure of the beer, the cock 68 is turned to cut-off the air supply and the beer is admitted by a hand valve or otherwise through the pipe 76 into the keg. As the keg fills the air therein is expelled through the pipe 86, the passage 48', and the vent pipe 45, the air raising the diaphragm 39' and the valve seat 44 as in the case of Fig. 3. When the beer rises so as to seal the end of the tube 86, the air then passes through the holes in the partition 78 and lifts the diaphragm 79 and the piston 41', thus closing the vent 45. The keg is thus filled with beer without permitting it to foam or lose any of the gas with which it has been charged. When the lower end of the tube 86 is sealed, the air above it finding no escape becomes compressed by the rising beer to such a degree that the diaphragm 79 and piston 41' are elevated as described.

We claim—

1. In a device for filling a receptacle with an effervescent liquid, means for admitting compressed gaseous fluid into said receptacle, means for admitting said liquid into the same, means operated by the compressed gaseous fluid to prevent the escape of said gaseous fluid from said receptacle until the liquid flows into the receptacle, and means operable by the said fluid when compressed by the liquid to overcome said means for preventing the escape of the fluid.

2. In a device for filling a receptacle with an effervescent liquid, means for admitting compressed gaseous fluid into said receptacle, means for admitting said liquid thereinto, a valve member in communication with the fluid in the receptacle, and a valve member mechanically distinct from the said first valve member and coöperating with the first valve member to prevent the opening of the valve mechanism except by the displacement of said gaseous fluid by said liquid.

3. In a device for filling a receptacle with an effervescent liquid, a valve to permit the fluid in the receptacle to escape as the liquid enters the same, a tube leading to said valve and pendent in said receptacle, and means for closing the said valve when the liquid seals the end of said tube.

4. In a device for filling a receptacle with an effervescent liquid, a valve having two movable sections, means connecting the opposite faces of one member with a source of fluid pressure, means for moving the other member when the liquid reaches a predetermined level in the receptacle, so as to coöperate with the first member to close the escape of fluid from the receptacle.

5. In a device for filling a receptacle with an effervescent liquid, a source of compressed gaseous fluid, a valve device, having therein two diaphragms carrying respective valve and valve-seat members, means for leading said fluid to said receptacle and to both sides of one diaphragm, and means to cause the fluid displaced in the receptacle by the inflowing liquid to actuate the other diaphragm and thereby prevent the escape of air from said valve, when the liquid reaches a predetermined level in said receptacle.

Signed at Pittsburg, Pa., this 6th day of March, A. D., 1906.

JOHAN G. HEHR.
CONRAD WEBER.

Witnesses:
F. N. BARBER,
C. E. EGGERS.